US006842458B1

(12) United States Patent
Reznic

(10) Patent No.: US 6,842,458 B1
(45) Date of Patent: Jan. 11, 2005

(54) PCM MODEMS USING COMMUNICATION LINES WITH MULTIPLE DIGITAL-TO-ANALOG CONVERTERS

(75) Inventor: Zvi Reznic, Tel-Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/522,658

(22) Filed: Mar. 10, 2000

Related U.S. Application Data

(60) Provisional application No. 60/123,881, filed on Mar. 11, 1999.

(51) Int. Cl.[7] .............................................. H04L 12/66
(52) U.S. Cl. ..................................................... 370/463
(58) Field of Search ............................... 370/204, 205, 370/212, 213, 463, 465, 466, 286, 287, 289; 375/222, 229, 230, 231, 232

(56) References Cited

U.S. PATENT DOCUMENTS

| 4,206,320 | A | * | 6/1980 | Keasler et al. ............. 370/204 |
| 5,581,585 | A | * | 12/1996 | Takatori et al. ............. 375/376 |
| 5,663,982 | A | * | 9/1997 | Hodge et al. ................ 375/222 |
| 6,069,879 | A | * | 5/2000 | Chatter ........................ 370/295 |
| 6,304,596 | B1 | * | 10/2001 | Yamano et al. ............. 375/222 |
| 6,498,806 | B1 | * | 12/2002 | Davis ........................... 375/222 |
| 6,522,688 | B1 | * | 2/2003 | Dowling ..................... 375/222 |
| 6,560,197 | B1 | * | 5/2003 | LeVieux et al. ............ 370/231 |

* cited by examiner

*Primary Examiner*—Kwang Bin Yao
(74) *Attorney, Agent, or Firm*—Wade James Brady, III; Frederick J. Telecky, Jr.

(57) ABSTRACT

The present invention discloses communications devices which improves communications of pulse code modulation modems which use communications lines with multiple digital-to-analog conversions. One embodiment of the present invention includes a plurality of codecs (312) which receive analog signals through multiple communications channels (310). Digital data streams generated by the codecs (312) from the analog signals is transmitted to an associated one of a plurality of digital signal processors (214). The digital signal processors (214) process the decoded data and then transfers the data to a digital modem (216) for further transmission.

5 Claims, 2 Drawing Sheets

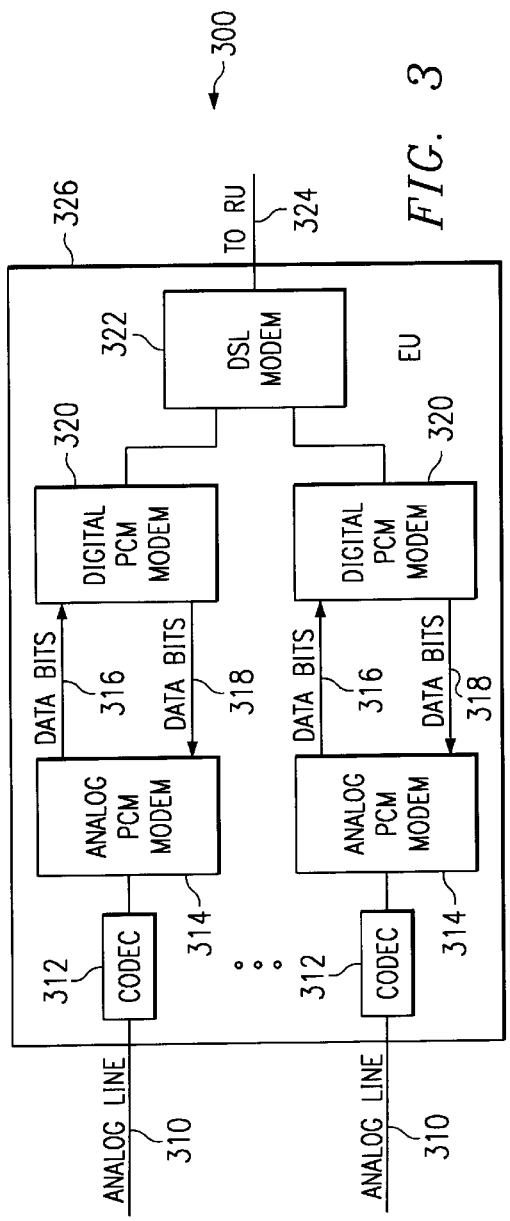
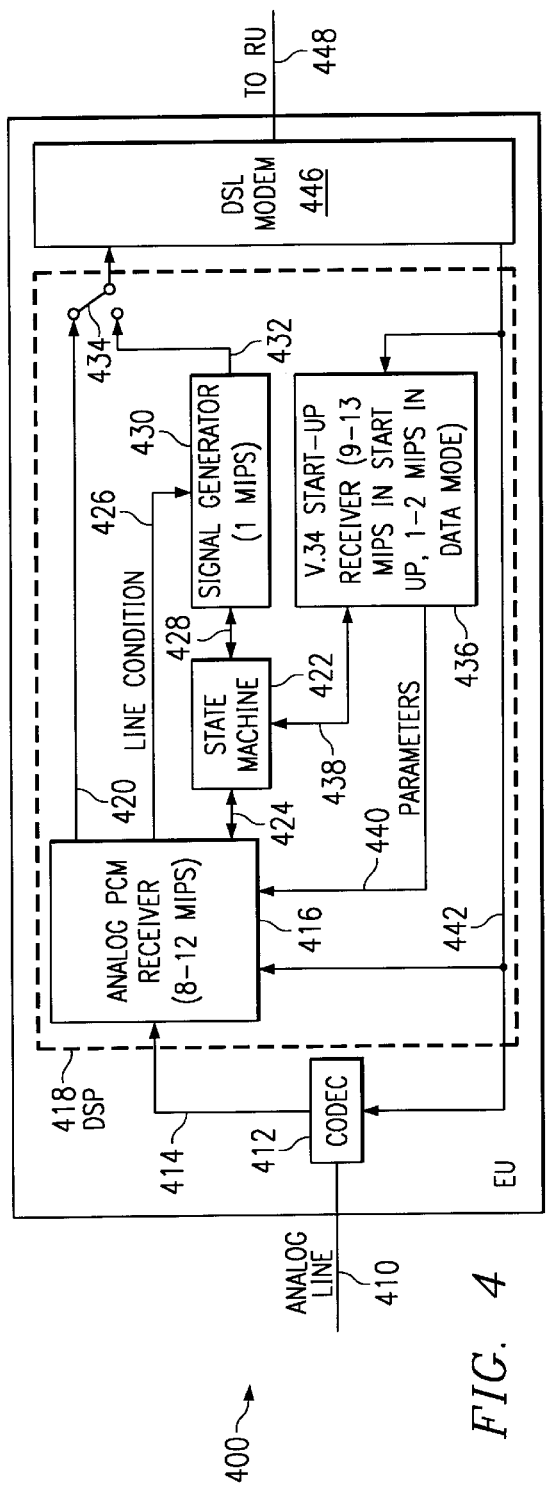

PCM MODEMS USING COMMUNICATION LINES WITH MULTIPLE DIGITAL-TO-ANALOG CONVERTERS

This application claims priority under 35 USC § 119(c)(1) of provisional application Ser. No. 60/123,881 filed Mar. 11, 1999.

TECHNICAL FIELD OF THE INVENTION

This invention relates generally to telecommunication and more particularly to pulse code modulation ("PCM") modems using communication lines with multiple digital-to-analog converters.

BACKGROUND OF THE INVENTION

An exemplary prior art telephone system is shown in FIG. 1. The telephone system 100 includes a V.PCM digital modem 110 which is connected to a digital channel 112 that terminates at central office 114. The V.PCM digital modem, also referred to as a V.90 modem, is described in the International Telecommunications Union, Telecommunication Standardization Sector (ITU-T), Recommendation V.90 (1998), herein incorporated by reference in it's entirety. The V.PCM digital modem 110 transmits PCM octets through the digital channel 112 to the central office 114. At the central office 114 the bytes are processed by a convert-and-filter device 116 which includes a $\mu$-law (or A-law) digital-to-analog converter ("DAC") followed by an analog PCM filter. The output of the convert-and-filter device 116 is then transmitted to a subscriber via an analog channel 118 which consists, for example, of two copper wires which typically are referred to as a twisted pair.

In some telephone systems the analog channel 118 consists of multiple ones of these twisted pairs, each twisted pair referred to as a "line", which are then in turn connected to a unit ("EU") 120 which is located outside the central office 114. The unit 120 includes a conversion device 122 which includes an analog front end ("AFE") and a $\mu$ law (or A-law) analog-to-digital converter ("ADC"). In the conversion device 122, once each line is processed by the $\mu$ law (or A-law) ADC, an output bit stream of distorted PCM octets 124 is sent to a second unit 126 (called "RU") via a digital modem (e.g., a digital subscriber line ("DSL") modem), not shown. At the RU unit 126 the bits are processed by conversion device 128 which includes another $\mu$-law (or A-law) DAC and a PCM filter. The resultant analog signal is sent to a subscriber via analog channel 130 and a V.PCM analog modem 132.

For many years the public digital telephone network (DTN) has been used for data transmission between modems. Typically, a modulated carrier is sent over a local loop to a service provider (e.g., a Regional Bell Operating Company), whereupon the service provider quantizes the signal for transmission through the DTN. A service provider that is located near the receiving location converts the digital signal back to an analog signal for transmission over a local loop to the receiving modem. This system is limited in the maximum achievable data rate at least in part by the sampling rate of the quantizers, which is typically 8 kHz (which rate is also the corresponding channel transmission rate, or clock rate, of the DTN).

Furthermore, the analog-to-digital (A/D) and digital-to-analog (D/A) conversions are typically performed in accordance with a non-linear quantizing rule. In North America, this conversion rule is known as mu.-law. A similar non-linear sampling technique known as A-law is used in certain areas of the world such as Europe. The non-linear A/D and D/A conversion is generally performed by a coder/decoder ("codec") device located at the interfaces between the DTN and local loops. Alternatively, these devices are referred to herein as a DAC and an ADC.

It has been recognized that a data distribution system using the public telephone network can overcome certain aspects of the aforesaid limitations by providing a digital data source connected directly to the DTN, without an intervening codec. In such a system, the telephone network routes digital signals from the data source to a client's local subscriber loop without any intermediary analog facilities, such that the only analog portion of the link from the data source to the client is the client's local loop (plus the associated analog electronics at both ends of the loop). The only codec in the transmission path is the one at the DTN end of the client's subscriber loop.

Because of the existence of two DACs in the exemplary telephone system 100, those lines effectively cannot carry 56K signals. Thus, subscribers who use 56K modems are generally unable to use these lines.

SUMMARY OF THE INVENTION

The present invention discloses improved operation of pulse code modulation modems using communications channels with multiple digital-to-analog converters.

These and other features of the invention that will be apparent to those skilled in the art from the following detailed description of the invention, taken together with the accompanying drawings.

DESCRIPTION OF THE DRAWINGS

FIG. 3 is a block diagram of a second embodiment of an EU unit in accordance the present invention; and FIG. 4 illustrates a third embodiment of an EU unit in accordance with the present invention.

DETAILED DESCRIPTION OF THE INVENTION

Figure 1:
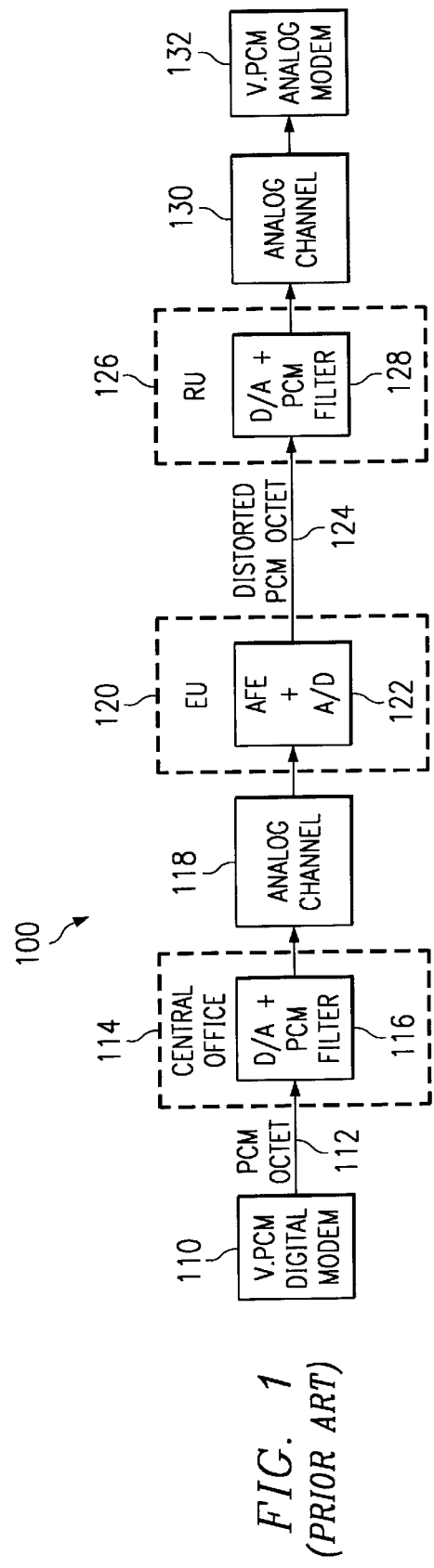
FIG. 1 is a block diagram illustrating an exemplary prior art telephone system.
Figure 2:
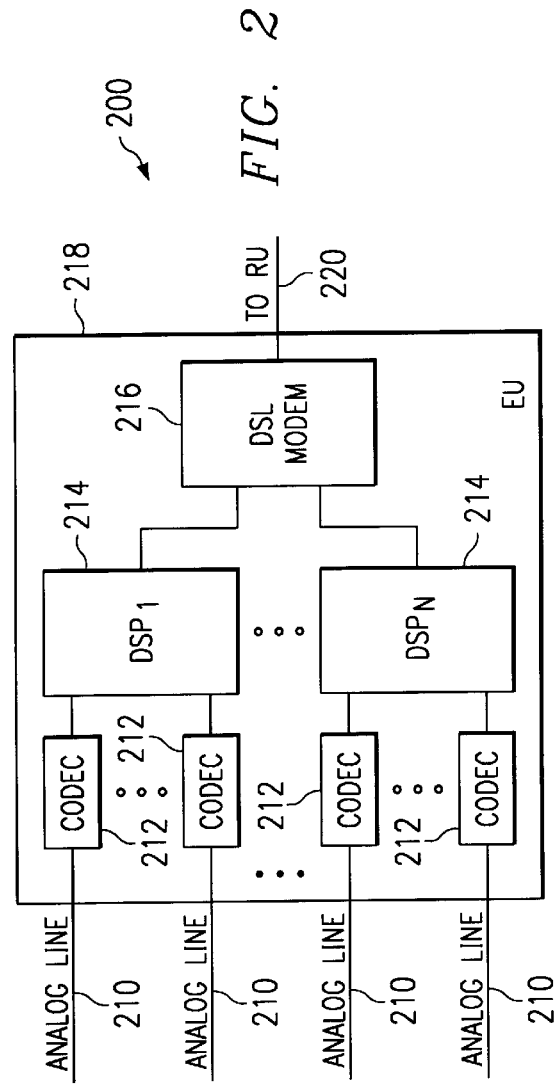
FIG. 2 shows a first embodiment of an EU unit in accordance with the present invention.

FIG. 2 shows a block diagram illustrating a first embodiment of an EU unit 200 in accordance with the present invention. The EU unit 200 receives as input signals from two or more analog lines 210. The input signals are processed by a coder/decoder ("codec") 212 associated with each of the analog lines 210. The outputs from multiple ones of the codecs 212 are processed by one of multiple digital signal processors ("DSPs") 214 included in the EU unit 200. Each of the codecs 212 in the EU unit 200 shown in FIG. 2 also include a linear ADC, not shown, which digitizes the signal before being output from the codec 212. The output of the ADC is then transmitted to one of the multiple DSPs 214 for further processing, discussed in more detail hereinbelow. After processing by the DSP 214, the resultant signal is transferred to a digital subscriber line ("DSL") modem 216 which transmits its output signal to an RU unit, not shown, via line 220. The embodiment of the EU unit 200 shown in FIG. 2 requires no change in the RU unit such as that shown in the prior art telephone system 100 in FIG. 1.

The DSP 214 shown in FIG. 2 executes in accordance with software instructions to implement a feed-forward equalizer. In a typical PCM modem call, only a subset of the available PCM levels are used. Therefore a conventional modem can detect with high confidence which PCM level was sent and is thus capable of implementing a decision-directed-equalizer ("DFE"). The DSP 214 shown in FIG. 2, however, is unable to detect which levels are used, and thus the probability of symbol error is too high to implement a DFE and thus a DFE should not be used. Usually there is a lot of attenuation at DC and at 4 Khz. When the DFE is not in use the FFE should be very long, i.e., 200 filter taps. During data-mode operation of the modem, a least mean square ("LMS") algorithm is used to adapt the equalizer's taps only when the detected symbol has a magnitude equal to or greater than a predetermined threshold. This is because in $\mu$ law (or A law) the difference between adjacent levels increases as the magnitude increase. Therefore, the probability of error with relatively large symbols is much smaller than the probability of error in relatively small symbols.

Equalizer training options in the EU unit 200 shown in FIG. 2 are as follows. The central office sends a pre-defined training signal to the EU unit 200 over the analog line 210 a short time before the beginning of the V.PCM modem start-up procedure. Since there is no practical method of determining in advance whether the call is a V.PCM call, in a telephone system which implements the embodiment of the EU unit 200 shown in FIG. 2, the central office sends the pre-defined training signal before every call. The length of the training signal should range from 0.5 to 1 seconds. The training signal can be sent at the beginning of the call (with the disadvantage of being heard by the user) or a short time prior to the call (i.e., 1 minute). Alternatively, signals that would otherwise be used for other functions, such as a Caller ID signal, may be used.

When installing the EU unit 200, a special training signal is sent to the EU unit 200. This can be done, for example, by dialing up the EU unit 200 from a remote modem, not shown, which is digitally connected to the telephone network. The EU unit 200 then waits for the training signal of phase 3 and trains according to that training signal. This requires (1) making sure it is a 56K call and not a V.34 call or voice call; and (2) re-generating the line-probing signal (the frequencies comb).

A second embodiment of the EU unit 300 in accordance with the present invention is shown in FIG. 3. The embodiment of the EU unit 300 shown in FIG. 3 is a higher cost solution relative to the embodiment of the EU unit 200 shown in FIG. 2 which also enables a subscriber to use a PCM modem at high speed. The EU unit 300 shown in FIG. 3 receives as input analog signals on analog lines 310. A codec 312 is associated with each of the analog lines 310 and decodes the received analog signal. The decoded signal from each of the codecs 312 is then sent to an associated analog PCM modem 314. Each of the analog PCM modems 314 are bidirectionally connected to an associated digital PCM modem 320.

In the EU unit 300 shown in FIG. 3, each of the digital PCM modems 320 communicates with a subscriber modem, not shown, as if it was the far end digital modem and each of the analog PCM modems 314 communicates with the far end digital modem as if he was the subscriber. The two PCM modems 314 and 320 operate "back to back" and bidirectionally transfer bit streams to each other. Additional control is required between the analog PCM modem 314 and the digital PCM modem 320 in that the two modems may connect at a different data rate. For example, the PCM modem receiver in the EU unit 300 may connect at 48 Kbps while the subscriber's PCM modem receiver connects at 49 Kbps. In this case, a controller unit, not shown, generates additional, non-informative bits, such as a long stream of ones in the case of V.34 connection. The V.34 modem is described in the International Telecommunications Union, Telecommunications Standardization Sector (ITU) Recommendation V.34 (1998) herein incorporated by reference in it's entirety.

FIG. 4 shows a third embodiment of an EU unit 400 in accordance with the present invention. The EU unit 400 is typically a medium cost (relative to the cost of implementing the EU unit 200 shown in FIG. 2 or the EU unit 300 shown in FIG. 3) solution that enables a subscriber to use a PCM modem at high speed. The EU unit 400 shown in FIG. 4 includes a codec 412 which accepts as input analog signals received through analog line 410. The decoded signal from the codec 412 is then input to DSP 418 which is bidirectionally connected to a DSL modem 446. The DSP 418 implements an analog PCM receiver 416. The output signal from the analog PCM receiver 416 is connected to switch 434 for output to the DSL modem 446. The analog PCM receiver 416 is also operable to generate line condition information which is output on line 426 to a signal generator 430. The output of the signal generator 430 is also connected to the DSL modem 446 through switch 434. The signal generator 430, is also bidirectionally connected to a state machine 422 through line 428. The state machine 422 is in turn bidirectionally connected to the analog PCM receiver through line 424. In addition, the state machine 422 is bidirectionally connected to a v.34 start-up receiver 436. The v.34 start-up receiver 436 accepts as input signals from the DSL modem 446 through line 442 and generates parameters which are transmitted to the analog PCM receiver 416 through line 440. The received signals from the DSL modem 446 are also transmitted to the codec 412 and to the analog PCM receiver 416 through line 442.

The analog PCM receiver 416 (which is contemplated to operate at between 8 and 12 million instructions per second) and the V.34 start-up receiver 436 are contemplated to operate only during start up. The idea generally is that the V.34 start-up receiver 436 listens to the information passed from the analog modem to the digital modem, and using that information determines the parameters characterizing the signal transmission. These parameters are later used in downstream transmission (from the digital modem to the analog modem). These parameters enhance the performance of the analog PCM receiver 416 and enable the analog PCM receiver 416 to better handle a null at DC. The reason for that is that the EU unit 400 is operable to determine which PCM levels are used and which are not and thus is operable to decode the symbols with a relatively low symbol error rate and therefore a DFE could be used.

The above mentioned parameters generated by the v.34 start-up receiver 442 are used in phase 3 and phase 4 of modem initialization and in data mode. Thus, the performance of the analog PCM receiver 416 is enhanced when operating during phase 3 and phase 4 of modem initialization and during data mode. The determination, however, of whether to proceed with a V.PCM call or to fall back to V.34 modem operation is made by the analog modem, during phase 2. Thus, there is a risk that the analog modem will decide to fall back to V.34 because the analog PCM receiver 416 is not operating at peak performance levels. To overcome this problem the signal generator 430 in included to generate clean signals during modem initialization phase 2 and in particular the line probing signal.

Other Embodiments

Although the present invention and its advantages have been described in detail, it should be understood that various changes, substitutions and alterations can be made herein without departing from the spirit and scope of the invention as defined by the appended claims.

What is claimed is:

1. A communications device responsive to analog signals received from a plurality of communications channels comprising:
   a plurality of converter devices, each responsive to the analog signals received from an associated one of said plurality of communications channels and operable to generate a decoded data stream from the analog signals;
   a plurality of analog modem devices and a plurality of digital modem devices, each analog modem device responsive to an associated one of said converter devices and further responsive to an associated one of said plurality of digital modem devices, and operable to transmit said decoded data stream to said associated one of said plurality of digital modem devices;
   each of said plurality of digital modem devices responsive to an associated one of said plurality of analog modem devices; and
   a digital subscriber line modem responsive to said plurality of digital modems and operable to transmit signals received from said plurality of digital modem devices.

2. A communication device responsive to analog signals received from a communications channel comprising:
   a converter device, responsive to the analog signals received from the communications channel and further responsive to a modem device and operable to generate a decoded data stream from the analog signals;
   a first receiver, responsive to said decoded data stream from said converter device and further responsive to said modem device and further responsive to parameters generated by a second receiver which characterize signal transmission on said communications channel;
   a signal generator, responsive to line condition information received from said first receiver device and a state machine;
   a state machine, responsive to said signal generator, said first receiver and a second receiver;
   said second receiver responsive to said state machine and said modem device, and operable to generate said parameters characterizing signal transmission on said communications channel; and
   said modem device, responsive to signals switchably received from said first receiver and said signal generator through a switching device and operable to transmit signals to a remote device.

3. The communication device according to claim 1 wherein each of said plurality of processor devices implements a feed-forward equalizer.

4. The communication device according to claim 3 wherein, during data mode operation of each said modem, the equalizer is adjusted only when the detected symbol has a magnitude greater than a predetermined threshold.

5. The communication device according to claim 3 wherein said equalizer further includes means for differentiating among different types of calls and means for training said equalizer prior to each call.

* * * * *